April 29, 1969    H. D. CUBBAGE    3,440,991
HAIR FAIRED CABLE
Filed Jan. 29, 1965

INVENTOR
HENRY D. CUBBAGE

BY    Stanley C Corwin   AGENT

ATTORNEY

United States Patent Office 3,440,991
Patented Apr. 29, 1969

3,440,991
HAIR FAIRED CABLE
Henry D. Cubbage, Oxon Hill, Md., assignor to the United States of America as represented by the Secretary of the Navy
Filed Jan. 29, 1965, Ser. No. 429,178
Int. Cl. F04d 29/02
U.S. Cl. 114—235
9 Claims The invention described herein may be manufactured and used by or for the Government of the United States of America for governmental purposes without the payment of any royalties thereon or therefor.

The present invention relates to fairing for towed objects and more particularly to hair-like fairing for tow cables.

The need for fairing towed cables has long been recognized when objects are towed through water. For example, the turbulence and drag attributable to the cable itself is a feature that has lead to a vareity of methods of fairing cable. Faired cables have reduced mechanical vibration and, consequently, there is a reduction in the noise generated by such vibration, a significant feature in sonar applications. Low vibration, too, represents reduced cable fatigue and longer life-time.

At the present time cables are faired in short articulated sections to provide a degree of flexibility to permit the fairing to conform to the water flow regardless of the situation of the cable. Although such devices have indeed reduced cable drag and vibration, they have not proved capable of conforming to the water flow under all conditions of cable angle or bend, nor has the conventional cable fairing proved suitable for reeling and storage on drums.

A fairing composed of hair-like strands has sufficient shortness of fairing section to provide the degree of flexibility required for the ability to conform to the various situations that a cable may obtain either in the circumstance of towing, being stored on a drum or handled over pulleys and drums. A fairing made up of many hairs or fibers attached to a cable provides the usual advantages of faired cables, such as lower drag and minimum cable vibration, yet is free to conform to the water flow without regard to cable angle and is free from the aforedescribed handling problems.

It is accordingly an object of the present invention to provide an inexpensive and completely flexible fairing for towed objects.

Another object of the present invention is to provide a fairing for towed objects capable of conforming to medium flow regardless of the situation of the object being towed.

A further object of the present invention is to provide a cable fairing that can be handled over pulleys and drums without added adaptive mechanism.

Other objects and advantages of the invention will become more fully apparent and better understood from the following description of a preferred embodiment of the invention, as illustrated in the accompanying drawings, in which.

Figure 1:
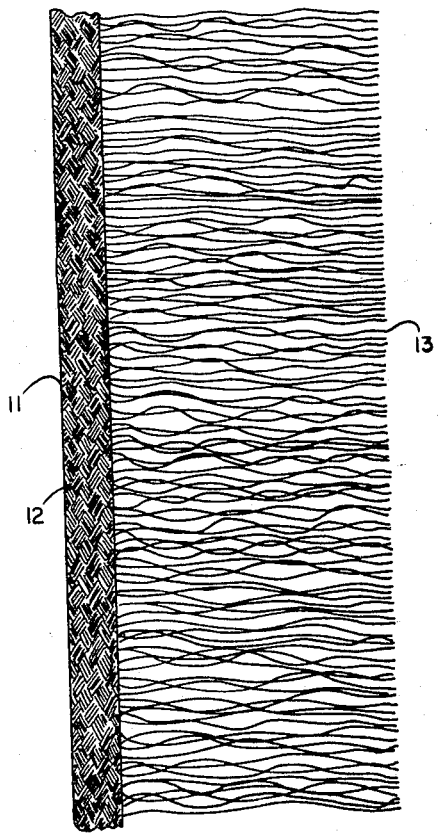
FIG. 1 shows an example of a section of a hair faired cable.

As shown in the drawings, the cable 11 may be of the variety which is sheathed in a basket-weave mesh-like sleeving 12 which can be in the form of a woven metallic binding serving to hold the cable together under the pressure at great ocean depths. The cable 11 shown in the drawings has a fairing consisting of many hair-like fibers 13 attached directly to the mesh sleeving.

Figure 2:
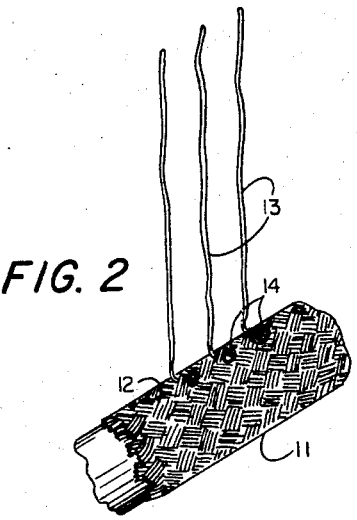
FIG. 2 and 3 show alternative ways of securing cable fairing.
Figure 3:
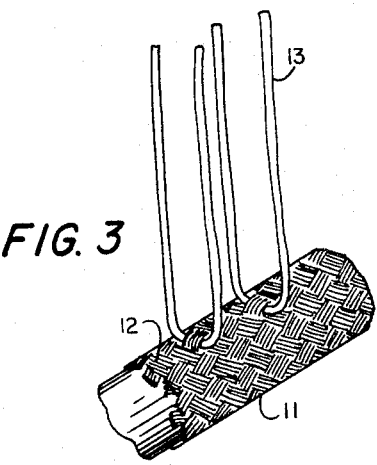

FIG. 2 illustrates the fibers or strands secured by a knot 14 at the end of each strand, while FIG. 3 shows the fibers tucked under a portion of the sleeving so that both ends of the fiber are free to trail in the water when the cable is dragged through that medium. It should be noted that the fairing is affixed to the cable in a line colinear with the length thereof.

While the sleeving provides a suitable base for anchoring the fairing to the cable, the haired fairing may be readily affixed to the cable by any of a variety of well known securing methods. For example, since the hair-like fibers themselves may be of a vinyl plastic material epoxy cement could be used to provide the bond.

While as shown in FIG. 1 the fiber length of the fairing may be three to six times the diameter of the cable, the actual length of the hairs of the fairing and in addition their diameter and material depend upon the various applications encountered. It should also be noted that while the haired fairing is shown evenly spaced along the length of the cable, the spacing of the fibers also would vary to provide the most desirable characteristics for the application at hand. Haired fairing, in addition is not limited to tow cables. It provides a ready and inexpensive means of streamlining objects which move through any of a variety of media.

Since various changes and modifications may be made in the practice of the invention herein described without departing from the spirit or scope thereof, it is intended that the foregoing description shall be taken primarily by way of illustration and not in limitation.

What is claimed and desired to be secured by Letters Patent of the United States is:

1. A fairing for an object to be towed through water, comprising:
   a plurality of hair-like fibers each being affixed to said object at a single point on said fiber so that each hair-like fiber is free to trail in the water after said object.

2. A fairing for an object as recited in claim 1, wherein said object is a tow cable.

3. A fairing for an object as recited in claim 2, wherein said fibers are affixed to said cable in a line colinear with the length thereof.

4. A fairing for a tow cable, comprising:
   a plurality of hair-like fibers affixed to said cable along a line colinear with the length thereof;
   each fiber having a fixed end secured to said cable and at least one free end;
   whereby as said cable is moved through a medium the free ends of said hair-like fibers will conform to the flow of said medium regardless of the situation of said cable in said medium.

5. A fairing for a tow cable as recited in claim 4, wherein said cable includes an external mesh sleeving and said hair-like fibers are secured to said sleeving.

6. A fairing for a tow cable as recited in claim 4, wherein the length of each of said fibers is at least three times the diameter of said cable.

7. A faired cable for towing through a fluid medium comprising:
   a cable core,
   a plurality of filamentary fairing elements of relatively high tensile strength, and
   means for securing said plurality of filtmentary fairing elements in spaced relation on said cable core whereby the fluid drag on said cable is decreased by said fairing elements.

8. A faired cable as defined in claim 7 further characterized by said means for securing said fairing elements on said core comprising:
   a sheath positioned surrounding said core, and means for engaging a portion of each of said fairing elements with a portion of said sheath to position said fairing elements to stream aft of said cable under tow.

9. A faired cable as defined in claim 8:
wherein said sheath comprises a basket-weave armored sheath of filamentary material
and wherein said filamentary fairing elements are interwoven with said filaments of said sheath to engage said fairing filaments to stream aft of said cable under tow.

References Cited

UNITED STATES PATENTS 1,773,580  8/1930  Franke _____ 57–143

OTHER REFERENCES

Undersea Technology, July 1964, p. 34.

TRYGVE M. BLIX, *Primary Examiner.*